June 2, 1970  KOICHI SUGIURA ET AL  3,515,434
SEAT ARRANGEMENT

Filed Sept. 6, 1968  2 Sheets-Sheet 1

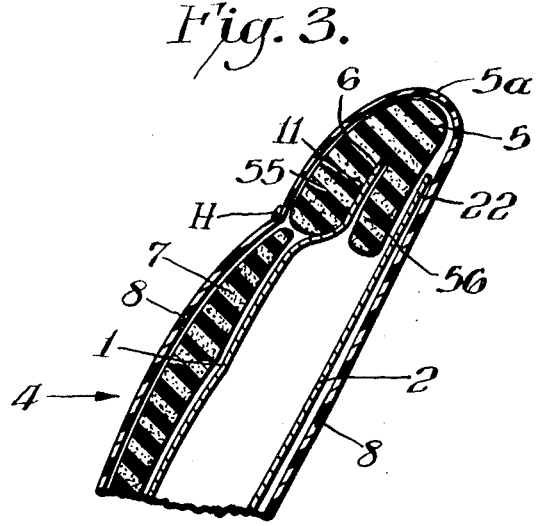
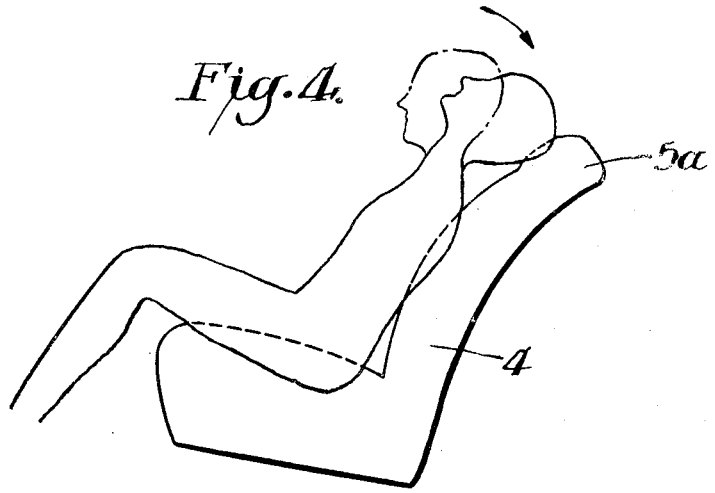

3,515,434
Patented June 2, 1970

3,515,434
SEAT ARRANGEMENT
Koichi Sugiura, Seizho Ohta, and Kiyokazu Seo, Toyota, Japan, assignors to Toyota Jidosha Kogyo Kabushiki Kaisha, Toyota, Aichi Prefecture, Japan, a corporation of Japan
Filed Sept. 6, 1968, Ser. No. 757,837
Claims priority, application Japan, Sept. 12, 1967, 42/78,051
Int. Cl. A47c 7/36
U.S. Cl. 297—396
1 Claim

ABSTRACT OF THE DISCLOSURE

Seat arrangement has head pillow support at top of seat backrest that prevents neck, brain or other injury to person utilizing seat arrangement.

BACKGROUND OF THE INVENTION

The present invention relates to a seat arrangement, and more particularly to a seat having a head pillow support that prevents injury to persons occupying such seat arrangements.

Conventional headrests of the type provided in the seats of automobiles, for example, function to prevent cervical spine damage to persons occupying the seats during automobile accidents, and in particular rear end collisions. For the most part, the prior art type of headrest constitutes a separate pillow attached to support structure connected to the backrest of the seat. With such constructions lateral and rearward vision of the automobile operator is seriously obstructed. Moreover, in most vehicles the headrests are considerably large structures that rise above the backrests of the front seats which make the automobile interior very narrow since the backrests appear as partition structure. Often, this causes an oppressive feeling on the part of the persons occupying the rear seats in the automobile.

Accordingly, an object of the present invention is to provide a unique seat having head support structure which avoids the above disadvantages of the prior art while functioning to adequately support the head and thereby lessen injury to passengers occupying the seat.

SUMMARY OF THE INVENTION

In accordance with the present invention a seat comprises forward and rearward frames spaced from one another and forming the outline of a backrest for the seat. The width at the upper portions of the frames is smaller than the width of the lower backrest portions to thereby form a head support at the top of the backrest. A cushion having a front hanging portion and a rear hanging portion with a channel between them is disposed at the top of the backrest. The upper portion of the forward frame fits into the channel and the rear hanging portion fits between the upper portions of the forward and rearward frames. Outer surface material covers the backrest to solidly form a head pillow support at the top thereof.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which:

FIG. 3 is a sectional view taken along line 3—3 of FIG. 2; and

FIG. 4 is a pictorial view illustrating the function of the seat according to the present invention.

DETAILED DESCRIPTION OF THE INVENTION

Figure 1:
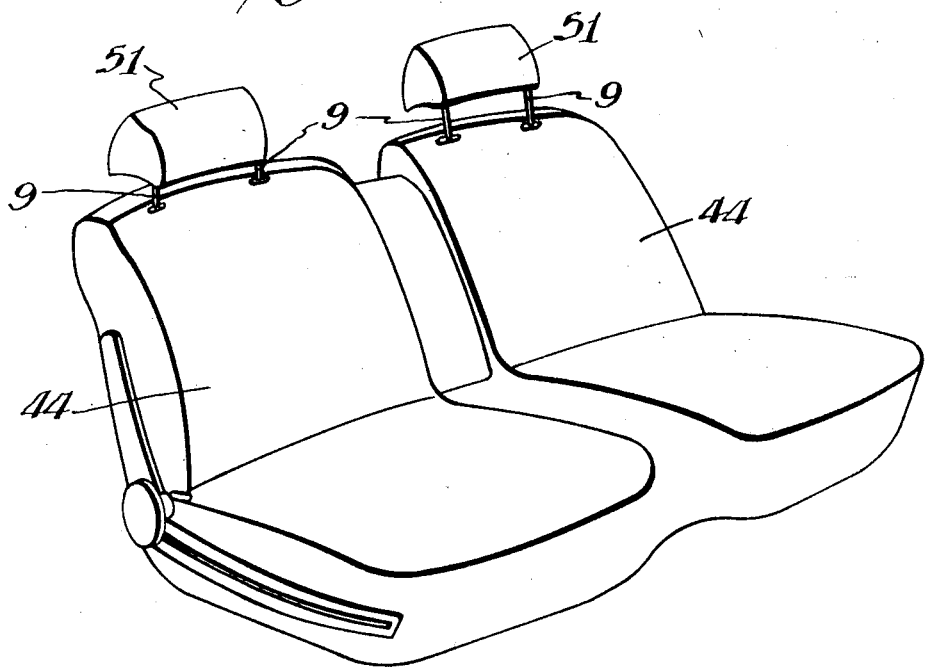
FIG. 1 is a perspective view illustrating the prior art.

Referring in more particularity to the drawing, FIG. 1 illustrates a conventional seat construction having a pillow type headrest 51 connected to the backrest 44 of the seat by means of supports 9 embedded in the headrest. The supports are connected to the backrest 44 in a manner well known in the art.

Figure 2:
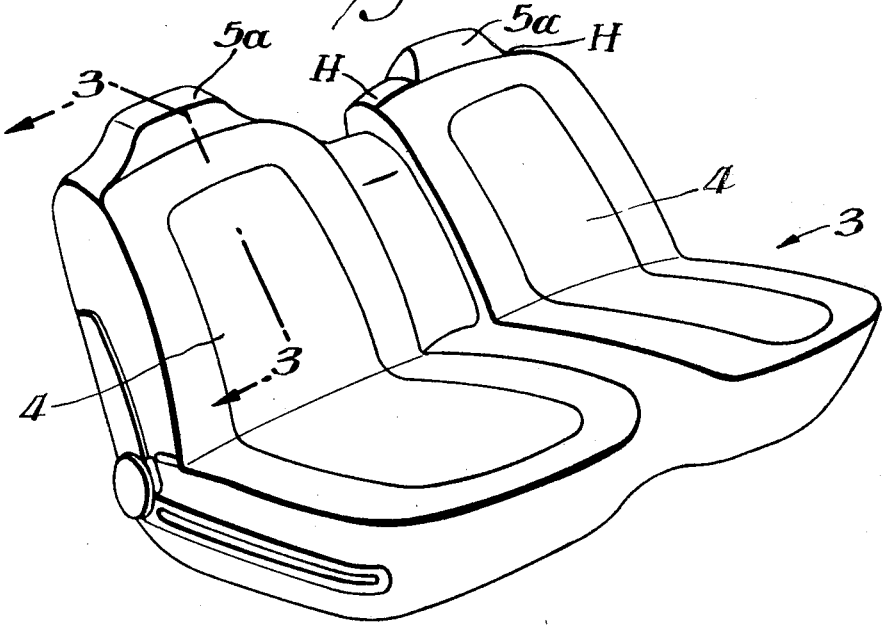
FIG. 2 is a perspective view illustrating a seat according to the present invention.

FIGS. 2-4 illustrate a seat arrangement 3 according to the present invention comprising a forward frame 1 and a rearward frame 2. Each of the frames may be constructed of rodlike material and other designs are also within the scope of this invention. The rearward frame 2 is spaced from the forward frame 1 and together these frames form the outline of a backrest 4 of the seat 3. As shown best in FIGS. 2 and 3, the upper portions 11 and 22 of the forward and rearward frames project above the surface H of the backrest 4.

Cushioning material 5 of a pillow 5a is provided at the top of the backrest. The material 5 has a front hanging portion 55 and a rear hanging portion 56 with a channel 6 between them. The upper portion of the forward frame 1 fits into the channel 6 as shown in FIG. 3. Additionally, the rear hanging portion 56 is disposed between the upper portions 11 and 22 of the forward and rearward frame, 1 and 2, respectively. Additional cushioning material 7 for the backrest 4 is located below the front hanging portion 55 of cushioning material 5 on the front surface of the forward frame 1.

The width of the cushioning material 5 for the pillow 5a is significantly smaller than the total width of the backrest and projects above the lower backrest portions. This feature is best illustrated in FIG. 2.

The cushioning materials 5 and 7 may be sponge, sponge rubber, felt or the like. Moreover, an upholstered covering may be provided for covering the frames 1 and 2, the cushioning material 5 for the pillow 5a and the cushioning material 7. The final outer surface material 8 may be vinyl, leather or the like.

The backrest of the present seat arrangement is constructed as high as the head position of a person occupying the seat with the backrest inclined rearwardly, as shown in the drawing. The degree of inclination is chosen so as to make the head of a person occupying this seat touch the head pillow support as the head is thrown back due to an accident and in particular, a rear end collision. Whiplash injury is thereby prevented. Unlike conventional seat constructions the seat of the present invention does not hinder rear vision of the vehicle operator. Moreover, with the head pillow support spaced a certain extent from the back of the head during normal sitting posture it is out of contact with the head and accordingly is not an unpleasant obstruction to the person utilizing the seat. Finally, as mentioned above, the head of the person occupying the seat is thrown rearwardly during a rear end collision and is stopped by the head pillow support before reaching an angle sufficient to cause neck damage or injury. The cushioning material functions to decelerate such movement of the head.

What is claimed is:
1. A seat comprising forward and rearward frames spaced from one another and forming the outline of a backrest for the seat, the width at the upper portions of the frames being smaller than the width of the lower backrest portions to form a head support at the top of the backrest, a cushion having a front hanging portion and a rear handing portion with a channel between them, the upper portion of the forward frame fitting into the channel and the rear hanging portion fitting between the upper portions of the forward and rearward frames, and outer surface material covering the backrest to thereby solidly form a head pillow support at the top of the backrest.

References Cited

UNITED STATES PATENTS

| | | | |
|---|---|---|---|
| 3,101,217 | 8/1963 | Requa | 297—391 |
| 3,293,669 | 12/1966 | Emery | 297—396 |

REINALDO P. MACHADO, Primary Examiner